United States Patent [19]

Reese et al.

[11] 4,206,110

[45] Jun. 3, 1980

[54] FLAMEPROOF POLYHYDANTOIN FILMS

[75] Inventors: Eckart Reese; Joachim Wank, both of Dormagen; Rudolf Binsack, Krefeld, all of Fed. Rep. of Germany

[73] Assignee: Bayer Aktiengesellschaft, Leverkusen, Fed. Rep. of Germany

[21] Appl. No.: 875,013

[22] Filed: Feb. 3, 1978

[30] Foreign Application Priority Data

Feb. 14, 1977 [DE] Fed. Rep. of Germany ....... 2706125

[51] Int. Cl.² .............................................. C08K 5/42
[52] U.S. Cl. ...................... 260/45.7 S; 260/45.75 M; 260/45.75 N; 260/45.8 RW; 260/45.85 H; 260/45.9 R; 260/45.95 G; 528/68; 528/73
[58] Field of Search ................ 260/45.75 P, 45.7 SF, 260/45.75 N, 45.9 R (U.S. only; 528/68, 73 (U.S. only)

[56] References Cited

U.S. PATENT DOCUMENTS

| | | | |
|---|---|---|---|
| 3,397,253 | 8/1968 | Merten et al. | 260/830 R |
| 3,775,367 | 11/1973 | Nouvertne | 260/45.7 SF |
| 3,853,810 | 12/1974 | Plank | 260/45.75 N |
| 3,876,584 | 4/1975 | Okada et al. | 528/68 |
| 3,933,734 | 1/1976 | Mark et al. | 260/45.7 SF |
| 4,035,447 | 7/1977 | Tonoki et al. | 260/45.75 P |
| 4,107,152 | 8/1978 | Hubner et al. | 528/68 |
| 4,116,934 | 9/1978 | Petersen et al. | 260/45.7 SF |

*Primary Examiner*—Morton Foelak
*Assistant Examiner*—R. A. White
*Attorney, Agent, or Firm*—Gene Harsh; Lawrence S. Pope

[57] ABSTRACT

Flame-resistant polyhydantoin sheets or films containing from 0.01 to 2% by weight of a salt of an organic sulphonic acid.

8 Claims, No Drawings

FLAMEPROOF POLYHYDANTOIN FILMS

The present invention relates to polyhydantoin sheets or films having flame-resisting properties.

High-molecular polyhydantoins, which are obtained, for example, by reacting aromatic diglycine esters with polyisocyanates, can be processed to films and sheets which are used, in particular, as electrical insulating lacquers and films in the electrical industry (U.S. Pat. No. 3,397,253, German Patent No. 1,230,568).

However, a disadvantage of these films is their flammability. Therefore they can be employed only to a limited extent for insulating parts undergoing severe exposure to heat, such as, for example, welding transformers, flexible conductor rails and transformers with an elevated operating temperature.

As is known, the flammability of plastics can be lowered by mixing them with halogen-containing substances, such as halogenated aromatic compounds, in particular diphenylene compounds, optionally with the simultaneous addition of metal salts, phosphorus compounds and other substances (see, for example, DOS (German Offenlegungsschrift) Nos. 2,013,496, 2,122,300, 2,153,101 and 2,243,226 and U.S. Pat. No. 3,357,942).

However, in order to achieve a decrease in the flammability the fireproofing agents must be added in concentrations of 5–20% by weight. The mechanical, thermal and dielectric properties of polyhydantoin films, however, are thereby impaired to such an extent that the films can no longer be used as electrical insulating films.

Another way of lowering the flammability of high-molecular polyhydantoin is to use halogen-containing isocyanates, such as, for example, tetrabromo- or tetrachloronaphthylene-diisocyanate, in the preparation of the hydantoins. However, in order to guarantee sufficient flame-resistance, even with thin sheets, such a high proportion of halogen-containing isocyanates must be co-condensed that the mechanical properties of the polyhydantoins, in particular, the tendency towards stress cracking, again no longer suffices for employment of the polyhydantoin sheets as an electrical insulating film. These stress cracks can occur in a film if the film is exposed to stresses under the action of nonsolvents, that is to say organic solvents which, however, do not dissolve polyhydantoins, at elevated temperatures.

Since it is very probable that electrical insulating films used as insulating material can come into contact with nonsolvents, for example in order to remove grease residues and oil residues, only those electrical insulating films can be used in which the tendency towards stress cracking is as low as possible. For this reason, therefore, it is not possible to lower the flammability of polyhydantoin films by one of the processes described.

Surprisingly, it has now been found that by adding a very small amount of alkali metal salts of organic sulphonic acids to high-molecular polyhydantoins, the flammability of the films prepared therefrom can be greatly reduced without the good mechanical and electrical properties necessary for an electrical insulating film being impaired. It is thus particularly surprising that, although ionic compounds are added, the electrical insulating properties are not impaired.

The present invention thus relates to a flame-resistant polyhydantoin sheet or film which contains from 0.01 to 2% by weight of an ammonium, or metal, preferably, an alkali metal or alkaline earth metal, salt of an optionally halogenated organic sulphonic acid.

Preferably salts of organic sulphonic acids of the general formula $$R-SO_3-M_e \quad (I)$$

in which

R represents $C_nHal_{2n+1}$, wherein

Hal=fluorine or chlorine and n represents a integer from 1 to 8, and

Me represents an element of group Ia, IIa or VIIIb of the periodic system of the elements, ammonium, as well as the corresponding salts of the sulphonic acid of the general formula (I) which contain, however, at least one carbon hydrogen groups, and salts of monomeric or polymeric aromatic sulphonic acids of the general formula $$R'(SO_3Me)y \quad (II)$$

in which

Me has the meaning indicated above,

R' represents an optionally halogenated aromatic radical with optionally condensed 1–4 aromatic rings and y represents an integer from 1–10, are used.

The metal salts of the sulphonic acids are preferably used in a concentration that an Oxygen Index of $\geq 25\%$, measured at a sheet thickness of 0.1 mm, is ensured. The maximum concentration is such that the electrolytic corrosion does not exceed the value A 1, that is to say no electrolytic corrosion takes place.

In general, a concentration of metal sulphonate of from 0.01 to 2%, preferably from 0.5 to 1.5%, by weight is sufficient to fulfill these conditions.

Preferred salts in the sense of this invention are the ammonium, alkali metal, alkaline earth metal or nickel salts, particularly, the potassium salts of the following sulphonic acids: perfluoromethanesulphonic acid, perfluoro-butanesulphonic acid, perfluorooctansulphonic acid, eicosonedisulphonic acid, naphthalene-2,6-disulphonic acid, 4,4'-dichloro-1,1'-dinaphthyl-sulphone-5,5'-disulphonic acid, 3,3',4,4'-tetrachlorobenzil-5-sulphonic acid, 2,5-dibromothiophene-3-sulphonic acid, 4,4'-dichlorodiphenyl sulphide-3-sulphonic acid, tetrachlorodiphenyl ether-disulphonic acid, 2,3,4,5,6-pentachloro-betastyrene-sulphonic acid, [pentachlorophenyl benzoate]-3-sulphonic acid, 3,5,6-trichloro-4-phthalate-sulphonic acid, 1',3'-bis-[1,4,5,6,7,7-hexachlorobicyclo(2.2.1)-hept-5-en-endo-2-yl]-benzenesulphonic acid, 2,4,5-trichlorobenzene-sulphonic acid anilide-4'-sulphonic acid and 3-(trifluoromethyl)-5-bromobenzene-sulphonic acid.

Sulphonic acid in which n in the general formula (I) is from 1 to 6 are particularly preferred.

High-molecular polyhydantions ($\overline{M}_w$ between 20,000 and 200,000) based on 1,5-naphthylene-diisocyanate and N,N'-di-bis-carbethoxymethyl-4,4'-diaminodiphenylmethane are preferably used for the production of the films according to the invention.

The cast films are produced by known techniques, for example by dissolving the polyhydantoin and the salt of the sulphonic acid together in a suitable solvent, such as methylene chloride or 1,2-dichloroethane, and optionally adding monohydric or polyhydric alcohols to give 5–20% solutions, which are cast on belt casting machines or drum casting machines, or by extrusion.

The films according to the invention are distinguished by a greatly reduced flammability and a low susceptibility to stress cracking and, in addition to their resistance towards unsaturated resins and temperature-resistant adhesives which contain a high proportion of solvent, exhibit the good mechanical, dielectric and, above all, thermal properties typical of polyhydantoin. They are thus outstandingly suitable for use as electrical insulating films with increased temperature resistance.

The flameproof character of the films was determined in accordance with the following tests:

1. Small burner test in accordance with DIN 53,438.

In this test, strip-shaped test pieces with the dimensions 190×90 mm (edge-flaming) or 230×90 mm (surface-flaming) are clamped vertically in a frame and flamed for 15 seconds with a 20 mm long propane gas flame. In the case of edge-flaming, the tip of the flame just touches the lower free edge of the sample; in the case of surface-flaming, the tip of the flame meets the surface of the sample 40 mm above the lower edge of the sample. What is observed is whether, and in what time, calculated from the start of flaming, the tip of the flame of the burning film reaches a marking made 150 mm above the point at which the flame is applied.

The samples are graded into classes K1, K2 or K3 or F1, F2 or F3 in accordance with the following system:

|  | Edge-flaming | Surface-flaming |
|---|---|---|
| The flame does not reach the measuring mark | K 1 | F 1 |
| The tip of the flame reaches the measuring mark in 20 or more seconds | K 2 | F 2 |
| The tip of the flame reaches the measuring mark in less than 20 seconds | K 3 | F 3 |

2. Determination of the Oxygen Index according to ASTM D 2,863-74.

The Oxygen Index is defined as the minimum oxygen volume concentration of a mixture of oxygen and nitrogen at which a test piece of given dimensions still just burns downwards like a candle. Strips of film with the dimensions 140×52 mm are clamped in a U-shaped sample holder with the longitudinal axis vertical and are ignited at the upper end with a gas flame. The Oxygen Index is that oxygen volume concentration at which the film still just burns down a length of 100 mm.

3. Test in accordance with the Test Instructions 94 of Underwriters' Laboratories (UL).

UL 94 has hitherto contained no data for testing films. A proposal for testing films, which was published on 24.7.1974 by the body responsible for revising UL 94, is being discussed as a supplement to UL 94. According to this proposal, 5 strips of film with the dimensions 203×47 mm are wound round a mandrel with a diameter of 9.5 mm to give, in each case, a roll of film 203 mm in length. The rolls of film are suspended vertically and are ignited on the underside twice for 3 seconds each time, using a Bunsen burner flame. The period over which the samples after-burn and whether cottonwool below the sample is ignited by material which falls off is determined.

The following grades are proposed for the classification:

94 VTF-0:

Films which neither produce drips of burning particles nor burn away up to a measuring mark made 127 mm above the flamed end of the roll of film. The maximum after-burning time may not exceed 10 seconds and the sum of the after-burning times for 10 flamings may not exceed 50 seconds.

94 VTF-1:

Requirements as for grade 94 VTF-0, but a maximum after-burning time of 30 seconds and a sum of the after-burning times of a maximum of 250 seconds.

94 VTF-2:

Requirements as for grade 94 VTF-1, but dripping of burning particles.

If a sample burns for longer than 30 seconds, such as, for example, in the case of cellulose triacetate, cellulose butyrate and normal polyhydantoin, it is not possible to grade the material in one of the three classes.

The electrolytic corrosion effect is determined in accordance with DIN 53,489, classification A 1 meaning "no electrolytic corrosion" both for the cathode and for the anode.

In order to measure the stress cracking, strips of film 15 mm wide are wound spirally round a glass rod with a diameter of 8 mm and are then put into toluene/n-propanol mixtures for 10 seconds. After drying, the strips of films are subjected to the tensile test in accordance with DIN 53,455.

The polyhydantoin films according to the invention are distinguished by a greatly lowered flammability, a low susceptibility to stress cracking, a low or non-measurable electrolytic corrosion and a high electrical resistance and exhibit the good mechanical, dielectric and thermal properties typical of polyhydantoin films.

EXAMPLE 1

A 15% strength solution in methylene chloride of a polyhydantoin, prepared from 1,5-naphthylene-diisocyanate and N,N'-di-bis-carbethoxy-methyl-4,4'-diamino-diphenyl-methane and having a relative viscosity of $\eta rel = 3.2$, measured in a 2% strength solution in methylene chloride at 25° C., and an average molecular weight $\overline{M}_w$ of about 80,000, is prepared. 1% by weight based on the polyhydantoin, of the potassium salt of perfluorobutanesulphonic acid, in the form of an alcoholic solution is added to this solution.

After degassing, the solution is cast on a drum casting machine to form films, the properties of which are given in Table 1.

EXAMPLE 2

(Comparison Example)

A film, the properties of which are listed in Table 1, is prepared according to Example 1 but without admixing the potassium salt of perfluorobutanesulphonic acid.

EXAMPLE 3

A polyhydantoin film, the testing of which is given in Table 1, is prepared according to Example 1, with the addition of 1% by weight of the potassium salt of perfluoroethanesulphonic acid.

EXAMPLE 4

A 13% strength solution in methylene chloride of a polyhydantoin, prepared from 4,4'-diphenyletherdiisocyanate and N,N'-di-bis-carboxy-methyl-4,4'-diaminodiphenyl ether and having a relative viscosity of 3.5, measured in a 2% strength solution in methylene chloride at 25° C., and an average molecular weight $\overline{M}_w$ of 90,000, is prepared. 1% by weight based on the polyhydantoin of the potassium salt of perfluorohexane-sulphonic acid, in form of an alcoholic solution is added to this solution. After degassing, the solution is cast on a belt casting machine to form films, the properties of which are given in Table 1.

TABLE 1

| Example | 1 | 2 | 3 | 4 |
|---|---|---|---|---|
| Properties | | | | |
| O$_2$ Index % 0.1 mm film thickness | 25 | 22 | 25 | 25 |
| Small burner test DIN 53,438, 0.1 mm | K1/F1 | K3/F3 | K1/F1 | K1/F1 |
| UL Subject 94 VTF | VTF-0 | VTF-1 | VTF-0 | VTF-0 |
| Tensile strength MPa (DIN 52,455) | >100 | >100 | >100 | >100 |
| Elongation at break % | >100 | >100 | >100 | >100 |
| Elongation at break %, after putting into toluene/n propanol for 10 seconds | | | | |
| 1 : 3.5 | >100 | >100 | >100 | >100 |
| 1 : 3 | >100 | >100 | >100 | >100 |
| Volume resistivity Ω cm (DIN 53,842) | 1 . 10$^{16}$ | 1 . 10$^{16}$ | 2 . 10$^{16}$ | 2 . 10$^{16}$ |
| Dielectric constant (DIN 53,483) (20° C./50 Hz) | 3.2 | 3.2 | 3.3 | 3.3 |
| Dielectric loss factor tan . 10$^4$ (20° C./50 Hz) (DIN 53,843) | 32 | 30 | 32 | 32 |
| Electrolytic corrosion effect (DIN 53,849) | A 1 | A 1 | A 1 | A 1 |

What we claim is:

1. A flame-resistant polyhydantoin sheet or film containing from 0.01 to 2% by weight of an ammonium or metal salt of an organic sulphonic acid.

2. A sheet or film according to claim 1 wherein the organic sulphonic acid is halogenated.

3. A flame-resistant polyhydantoin sheet or film containing from 0.01 to 2% by weight of an ammonium or metal salt of an organic sulphonic acid of the formulae

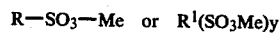

R—SO$_3$—Me or R$^1$(SO$_3$Me)$_y$ (I)          (II)

wherein

R is C$_n$Hal$_{2n+1}$

Hal is fluorine or chlorine n is an integer from 1 to 8, and

Me is an element of group Ia, IIa or VIIIb of the periodic system of the elements, or ammonium, R' is a halogenated aromatic radical containing optionally condensed 1 to 4 aromatic rings, and y is an integer from 1 to 10, or wherein said sulphonic acid salt is a salt of the sulphonic acid of the general formula (I) which contains at least one carbon hydrogen group.

4. A sheet or film according to claim 3 wherein the metal is an alkali metal or alkaline earth metal.

5. A sheet or film according to claim 3 wherein Me is nickel or potassium.

6. A sheet or film according to claim 3 wherein n is from 1 to 6.

7. A sheet or film according to claim 3 wherein the polyhydantoin is based on 1,5-naphthylene-diisocyanate and N,N'-di-bis-carbethoxymethyl-4,4'-diaminodiphenylmethane.

8. The flame-resistant polyhydantoin sheet or film of claim 1 wherein as salt the ammonium, alkali metal, alkali earth metal or nickel salt, of perfluoromethanesulphonic acid, eicosonedisulphonic acid, naphthalene-2,6-disulphonic acid, 4,4'-dichloro-1,1'-dinaphthyl-sulphone--5,5'-disulphonic acid, 3,3',4,4'-tetrachlorobenzil-5-sulphonic acid, 2,5-dibromothiophene-3-sulphonic acid, 4,4'-dichlorodiphenyl sulphide-3-sulphonic acid, tetrachlorodiphenyl ether-disulphonic acid, 2,3,4,5,6-pentachloro-betastyrene-sulphonic acid, [pentachlorophenyl benzoate]-3-sulphonic acid, 3,5,6-trichloro-4-phthalate-sulphonic acid, 1',3'-bis-[1,4,5,6,7,7-hexachlorobicyclo(2.2.1)-hept-5-en-endo-2-yl]-benzenesulphonic acid, 2,4,5-trichlorobenzene-sulphonic acid anilide-4'-sulphonic acid or 3-(trifluoromethyl)-5-bromobenzenesulphonic acid is used.

* * * * *